United States Patent [19]

Carpenter

[11] 4,163,336

[45] Aug. 7, 1979

[54] LIVE BAIT INSERT APPARATUS

[76] Inventor: Roger C. Carpenter, Rte. 3, Box 133 B, Fish Lake Rd., Pelican Rapids, Minn. 56572

[21] Appl. No.: 869,103

[22] Filed: Jan. 13, 1978

[51] Int. Cl.² ............................................ A01K 83/02
[52] U.S. Cl. ...................................... 43/37; 43/42.44; 43/43.4
[58] Field of Search .............. 43/34, 35, 36, 37, 42.44, 43/43.4, 44.2, 44.8

[56] References Cited

U.S. PATENT DOCUMENTS

| 834,307 | 10/1906 | Landon | 43/36 |
| 1,672,498 | 6/1928 | Otto | 43/37 X |
| 2,325,247 | 7/1943 | Helfenstein | 43/36 |
| 3,802,114 | 4/1974 | Diebold | 43/37 |

Primary Examiner—Nicholas P. Godici

[57] ABSTRACT

Hooked apparatus for insertion within minnow bait utilizes an elongated body having an axial bore through which a leader extends forward to join a plurality of straight fishing hooks. When in retracted position, these rest, with their eye ends forward of their barbed ends, inside a hollow conical nose secured to the forward end of the body, the hook shanks resting in troughs formed in the forward end of the body leading slantingly rearward to outlets, where the barbed hook ends rest. Tension on the leader drives the hooks outward to project from the body and through the minnow bait.

5 Claims, 2 Drawing Figures

U.S. Patent    Aug. 7, 1979    4,163,336
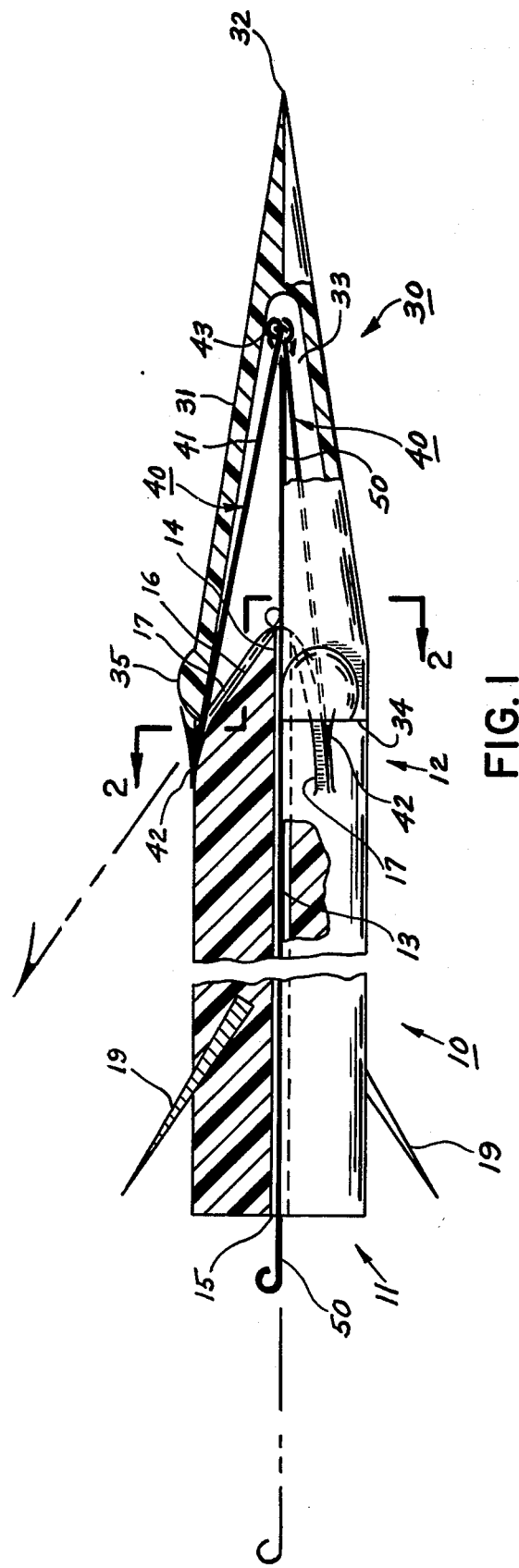
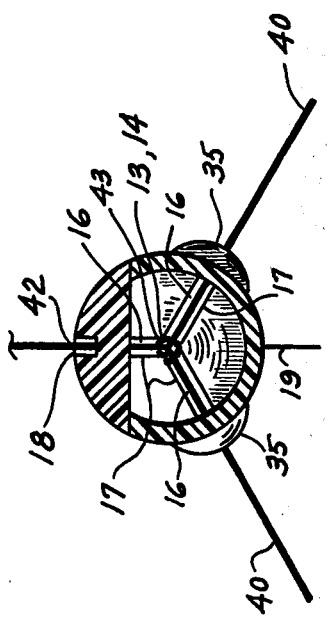
FIG. 1
FIG. 2

LIVE BAIT INSERT APPARATUS

BACKGROUND OF THE INVENTION

It is generally known that a fishing lure with concealed hooks is less likely to become snagged and more attractive to fish. Stationary curved hooks concealed by the fins of minnow-shaped artificial fishing lures are shown in U.S. Pat. No. 3,755,952 to Oliphant and U.S. Pat. No. 1,855,096 to Chamberlaine.

Others have fashioned artificial fishing lures utilizing hooks which are so concealed that they require movement from their concealed position in order to bare the hook. In U.S. Pat. No. 3,159,940 to Bokun, a curved hook is hinged rotatably into a concealed position, springing out when a fish touches the lure. In U.S. Pat. No. 3,631,624 to Edde, a curved hook is ejected longitudinally from a protective chamber by a spring-loaded trigger when a fish strikes the lure. U.S. Pat. Nos. 1,362,562 and 2,814,149 to Doane and Hunicke, respectively, utilize curved hooks whose barbs remain concealed until the fish closes its mouth on the shanks of the hooks, which urges the hooks to rotate about a fixed hinge point and drives the barbs outward into the flesh on the inside of the fish's mouth. In the Doane patent, the hooks are held in the concealed position by the water stream drag on vanes integrally formed on the shanks of the hooks, while in the Hunicke patent this function is performed by a coil spring.

FIELD OF THE INVENTION

This invention relates to fishing lures and specifically to a type of multi-hook apparatus to be inserted within a minnow or other natural bait.

SUMMARY OF THE INVENTION

An object of the present invention is to provide a device for catching fish in which the hooks are concealed so they cannot snag on weeds and fish cannot see them. Another object of the present invention is to provide a simple apparatus for catching fish in which the hooks are initially concealed, but come from their concealed position when a fish has taken the bait in its mouth. A further object of the present invention is to provide an apparatus in which hooks are concealed within live bait and are brought forth when the fish takes the bait.

Briefly described, the present invention is an apparatus, insertable within live bait such as minnows, which utilizes a plurality of straight hooks. The apparatus has an elongated body having an axial bore extending from an inlet at its forward portion to an outlet at its tail portions. The tail portion has outward-, rearward-extending barbs, to hold the apparatus within the bait into which it is inserted. The forward portion of the body has, inwardly of a nose cone, a camming surface outwardly adjacent to the axial bore inlet, and a plurality of troughs extending outward and rearward to outlets at the outer surface of the body. Each trough is of sufficient width to accommodate one of the hooks.

A leader joins the hook eyes together and extends through the axial bore and outward from its outlet. The apparatus is completed by the conical hollow nose whose rear edge is attached to the forward portion of the body and extends forward to a pointed tip. The nose cone provides an enclosure into which the hooks are normally positioned with their eye ends forward of their barbed ends, which rest at the trough outlets.

When the leader is drawn rearward relative to the body, as when a fish takes the bait in its mouth and the fisherman pulls on the leader, the hooks are driven from their retracted position, described above, to an extended position in which the hooks rest in the troughs and project outward through the trough outlets. They thereby are driven to extend through and outward from the body of the live bait.

BRIEF DESCRIPTION OF THE DRAWINGS

FIG. 1 is a side view of a preferred embodiment of the present invention. The upper half is a cross-section, while the lower half is an elevation partially cut away to show the leader and hooks. The phantom lines show one of the hooks in extended position when the leader is drawn backward.

FIG. 2 is a sectional view taken along line 2—2 of FIG. 1, with the hooks in extended position.

DESCRIPTION OF THE PREFERRED EMBODIMENT

The preferred embodiment of the present invention, as shown in the accompanying drawings, is, as to the greatest part of its length, comprised of an elongated cylindrical-shaped body part, generally designated 10. This may be made up of flexibly-joined metal links whose construction is well known. For ease of illustration, however, the body part 10 is shown as a single part, as may be molded of a plastic material of desired resiliency. The rear of the body is generally referred to as the tail portion 11, while its remainder is called the forward portion 12. A passage 13, made up of an axial bore, extends from an inlet 14 at the forward end of the forward portion 12 of the body 10 to an outlet 15 at the aft end of its tail portion 11. The passage 13 is of sufficient diameter to permit a fishing line leader to fit slidably therewithin.

Immediately adjacent the inlet 14 at the forward end of the forward portion 12 of the body 10 is a camming surface 16. Extending outward through the camming surface are three troughs 17, each which extends slantingly rearward and outward radially to trough outlets 18 at the outer surface of the body 10. The troughs 17 are of sufficient width to accommodate the shank of a standard straight fishing hook, to be described below. The trough outlets 18 are of sufficient width to accommodate the hooks and of greater length than the barbs on the hooks, as will be described below.

On the tail portion 11 of the body 10, extending outward and rearward in direction, are two barbs 19, shown in the accompanying FIG. 1 embedded in the plastic body 10.

The remainder of the exterior of this apparatus is comprised of a plastic tapered or conical nose part, generally designated 30, having an outer surface 31 extending broadeningly from a pointed tip 32 at its forward end. The nose 30 has a hollow inner cavity 33 and extends rearward to a rear edge 34, which is so shaped as to permit attachment to the forward portion 12 of the body 10. The nose 30 may be provided with three protrusions 35 on its outer surface 31, so spaced about the surface 31 and placed at the rear of the nose 30 as to be forwardly adjacent of the trough outlets 18 upon the nose 30 being attached to the body 10. Alternatively, instead of the three protrusions 35, the nose 30 might have a continuously enlarged diameter at its rear edge 34, such that the outer surface 31 of the nose 30, immediately forward of the body 10, would forwardly shield the trough outlets 18. As a further alternative, the nose part 30 might be formed integrally with the body part 10 as by the "lost wax" technique, leaving provision for insertion of the hooks.

The apparatus is provided with three metal fishing hooks 40, each being of such length that it may be accommodated within the hollow inner cavity 33 of the nose 30 and a trough 17 of the body 10. The hooks 40 are substantially straight along their entire length, having a straight shank 41 with a barb 42 at one end and an eye 43 at its other end.

A fishing line leader 50 is passed through the passage 13 of the body 10, extending outward from the outlet 15, and is utilized to join the hook eyes 43 forwardly of the inlet 14 of the forward portion 12 of the body 10. The hooks 40 are so positioned within the enclosure formed by the inner cavity 33 of the nose 30 and the troughs 17 of the body 10 such that their eyes 43 are forward of their barbs 42. In this retracted position, the hooks 40 lie in the nose 30 with their barbs 42 outward and adjacent the trough outlets 18 and their eyes 43 at the forward end of the inner cavity 33 of the nose 30.

In manufacture of the device, the leader 50 is fed through the passage 13 and the hooks 40 are joined at their eyes 43 forwardly of the forward portion 12 of the body 10. The hooks 40 are tucked within the nose 30 with their barbed ends at the trough outlets 18, and the nose 30 is secured at its rear edge 34 to the forward portion 12 of the body 10, by conventional means, such as adhesive or sonic welding.

In utilization of the preferred embodiment of the present invention, the device is inserted within the body of a minnow until the barbs 19 on the tail portion 11 of the body 10 are within the body of the minnow; this prevents the device from pulling out of the minnow. The leader 50 is attached to the fishing line. If a fish should "strike" at the minnow and take part of it into its mouth and the fisherman respond by pulling on the fishing line, the eyes 43 of the hooks 40 are pulled aft, causing the hook shanks 41 to bear against the camming surface 16 of the forward portion 12 of the body 10. The hooks 40 thus rotate about the camming surface 16 and are driven outward through the trough outlets 18. Their rotation continues until the shank 41 of the hook 40 abuts the troughs 17 on one side and the exposed rear edge 34 of the nose 30 adjacent the trough outlet 18 on the other side. The hooks 40 now project outward from the device at an extended position, through the flesh of the minnow at a slight rearward angle. A fish cannot pull free from the hooks 40, because their angular rotation forward is restricted by the rear edge 34 of the nose 30 and the camming surface 16 of the body 10.

After the fish has been caught and removed from the hooks 40, the apparatus may be prepared for reuse by retracting the hooks 40 into position within the nose 30. To facilitate such retraction without the fisherman having to touch the barbs 42 of the hooks 40, the leader 50 may be made of a stiff material, such as a steel wire; hence, the hooks 40 are retracted simply by pushing forward on the leader 50.

Although the apparatus has been described as insertable within live bait, it will be obvious to persons skilled in the art that the body 10 and nose 30 of the apparatus could be so fashioned as to serve as an artificial lure having concealed hooks. Other modifications to the described apparatus will likewise suggest themselves to persons skilled in the art.

I claim:

1. Live bait insert apparatus for use in fishing, comprising
    a plurality of hooks of the straight type, each having
        a shank with a barb at one end and an eye at the other end,
    an elongated body part having
    an axial bore extending through said body from an inlet at its forward portion to an outlet at its tail portion,
    said tail portion having, extending from its outer surface, outward-rearward extending barbs,
    said forward portion having
    a camming surface outwardly adjacent to said inlet and further having
    a plurality of trough means extending outwardly and rearwardly through said camming surface to trough outlets at the outer surface of said body part, each trough means being of such width as to accommodate the shank of one of said hooks, together with
    a leader joining said hook eyes together forward of said inlet of said axial bore and extending therefrom through said axial bore and outward from its outlet, further comprising
    a tapered hollow nose part having
    a pointed tip and extending broadeningly therefrom to
    a rear edge by which said nose part is secured to the said forward portion of said body part, whereby to provide an enclosure at the forward portion of said body part within which to accommodate said plurality of hooks with their eye end forward in a retracted position within said hollow inner part and with their barbs resting at such trough outlets,
    whereby when said leader is drawn rearward relative to said body part, each said hook is driven from said retracted position so that its shank bears against said camming surface, and is cammed to an extended position projecting outward at an angle limited by the rear edge of the nose part.

2. The apparatus as defined in claim 1, and wherein said nose part further has
    a protrusion forwardly adjacent to each of said trough outlets,
    whereby to aid in forwardly shielding the barbed ends of the hooks when in retracted position.

3. Apparatus for use in fishing, comprising
    a body portion having
    a passage leading from an inlet at its forward end to an outlet at its aft end, and
    a camming surface at its forward end outward of and adjacent to said inlet,
    a plurality of substantially straight hooks, each having a shank with a barb at one end and means to attach a leader at the other end,
    leader means to join said hooks together forward of said inlet of said passage and to extend through said passage and outward from its said outlet,
    means to position said hooks in a retracted position with their said means to attach a leader extending forward of their said barb ends, and with their shanks spaced angularly from each other about said forward end of said body portion and extending slantingly aft and outward, and
    means, forward of said barbs of said hooks and outward of said camming surface, to restrict the forward angular movement of said hooks, said means including
a hollow substantially conical nose portion having a pointed tip and a rear edge by which the nose part is secured to the forward end of said body portion, whereby, when said leader means is drawn aft relative to said body portion, the shanks of said hooks bear against its said camming surface and are driven from such retracted position outward and rotate angularly forward to a barb-extended position with the shanks bearing against said means to restrict forward angular movement.

4. The apparatus as defined in claim 3, wherein
said body portion further has, at its said aft end, outward-rearward extending barbs,
whereby if such apparatus is inserted within live bait, to restrain it from withdrawal from such bait when said leader is drawn aft.

5. The apparatus as defined in claim 3, wherein
said rear edge of said nose portion is enlarged relative to said forward end of said body portion, whereby to aid in forwardly shielding the barbed ends of the hooks when in retracted position.

* * * * *